No. 849,095. PATENTED APR. 2, 1907.
A. A. AMBLER.
VEHICLE WHEEL.
APPLICATION FILED MAR. 12, 1906.
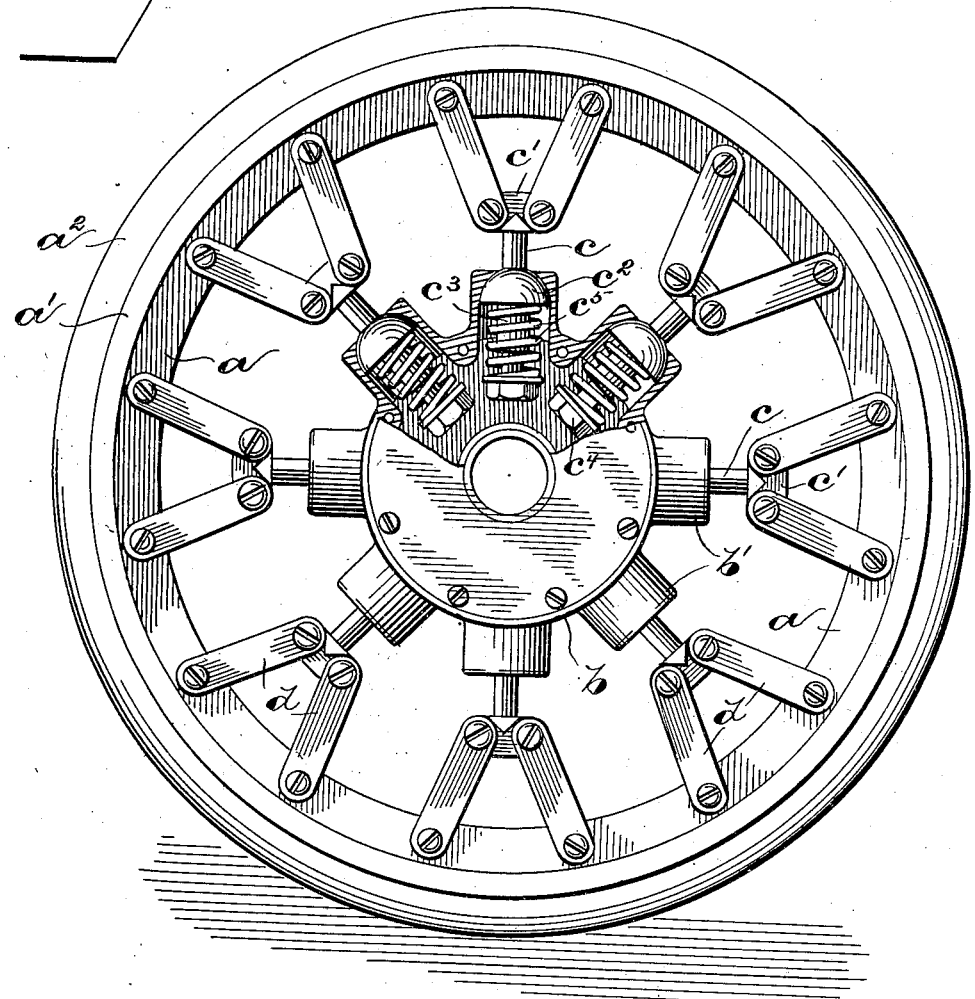
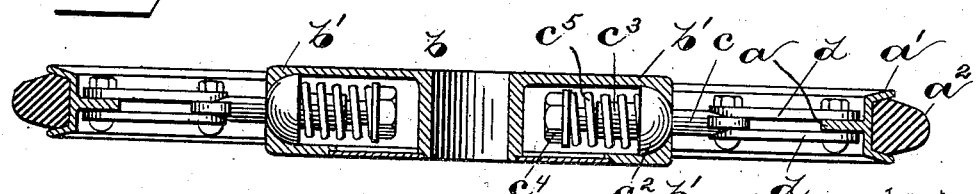

UNITED STATES PATENT OFFICE.

ARTHUR A. AMBLER, OF SPRINGFIELD, OHIO.

VEHICLE-WHEEL.

No. 849,095. Specification of Letters Patent. Patented April 2, 1907.

Application filed March 12, 1906. Serial No. 305,696.

*To all whom it may concern:*

Be it known that I, ARTHUR A. AMBLER, a citizen of the United States, residing at Springfield, in the county of Clark and State of Ohio, have invented certain new and useful Improvements in Vehicle-Wheels, of which the following is a specification.

My invention relates to improvements in vehicle-wheels, and it more particularly relates to a wheel of the suspension type constructed of a flexible or elastic character.

The object of my invention is to provide a wheel which will be of sufficient strength for heavy work and at the same time be flexible and elastic in its nature to compensate for jars and shocks, due to the unevenness in the road or to obstructions, &c.

My invention consists in the constructions and combinations of parts hereinafter described, and set forth in the claims.

In the accompanying drawings, Figure 1 is a side elevation of a vehicle-wheel embodying my invention, part of the hub-casing being broken away to better show the parts. Fig. 2 is a sectional view of the same, taken through the center of the hub. Fig. 3 is a detail showing a modification.

Like parts are represented by similar characters of reference in the several views.

In the said drawings, $a$ represents a metallic rim or felly of the wheel, having preferably formed thereon a metallic channel $a'$ to receive a rubber tire $a^2$. The hub $b$ of the wheel is formed hollow, with one of its sides removable to permit access thereto, and is provided on its periphery with a series of radial bosses $b'$. These bosses are perforated and have extending therein a series of metallic spokes $c$, having T-shaped outer heads $c'$. About each of the spokes within the interior of its boss is a hemispherically-shaped collar $c^2$, the inner face of the boss being formed of a shape to correspond with the shape of the collar, as shown. Said collar preferably has an extended sleeve $c^3$ about said spoke to better maintain the relation of the parts. On the inner end of each of the spokes is an adjusting or compression-nut $c^4$, the inner end of the spoke being formed screw-threaded to receive the same, and between said nut and the collar $c^2$ and encircling the spoke is placed a helical spring $c^5$. Each of the series of radial spokes $c$ is connected to the felly or rim of the wheel by flexible straps $d$ of fibrous material, such as leather, canvas belting, or other similar substance. These connecting-straps for each spoke are preferably four in number, arranged in pairs, each pair being connected to the T-head on either side of the spoke. The straps of each pair are further connected to opposite sides of the T-head, as shown, and to opposite sides of the rim or felly. The respective pairs of straps diverge from said T-head to their respective points of attachment to the wheel-rim, as shown.

By the construction described I have provided a wheel which will not only take up the shock incidental to passing over obstructions, but by reason of the flexible connecting-straps $d$ and the constructions described of the universal joint formed by the hemispherically-shaped collar and corresponding face of the boss the rim of the wheel will be permitted to swerve or spring laterally independent of the hub when meeting certain obstructions, permitting the hub to continue in its straight running course.

The nuts on the respective spokes provide means for adjusting the device to take up any lost motion and also to secure more or less resilience in the wheel, according to the load of the vehicle or the desire of the operator.

In Fig. 3 I have shown a modification in which instead of the helical spring $c^5$ I employ an elastic cushion of rubber $e$. In this construction, also, I dispense with the sleeve $c^3$ on the collar $c^2$.

The flexible straps on opposite sides of the T-heads are diverged, as before stated, to their respective points of connection to the rim, this divergence being such as to bring the said straps substantially tangent to a circle within the hub. By this construction it will be seen that the twisting action of the hub, (in the case of the driving-wheels of a motor-vehicle, for instance,) will bring the line of strain on the rim in a direct line from the center of the hemispherical joints. In other words, this action will tend to bring the flexible connecting-strap on the forward side of the wheel in line with its spoke if the vehicle is moving forward and the strap on the opposite side in line with said spoke when the vehicle is backed. By this construction whenever a torsional strain is brought upon the wheel it will be distributed throughout the entire periphery of the wheel, the said strain being through the radial spokes and the respective series of straps on that side of the radial centers of the spokes in the direction in which the wheel is turning, depending on whether the vehicle is moving forwardly or backwardly.

Having thus described my invention, I claim—

1. In a vehicle-wheel, an outer rim, an inner hub, a series of spokes radiating from said hub, interposed cushions between the spokes and hub, and a separate flexible connecting part between each of said spokes and said rim, substantially as specified.

2. In a vehicle-wheel, an outer rim, a series of inner spokes, a series of flexible connecting parts between said spokes and rim, and an inner hub suspended by said inner spokes, and an interposed cushion between each of said spokes and said hub, substantially as specified.

3. In a vehicle-wheel, an outer rim, an inner hub suspended therefrom, the connections between said rim and hub being such as to form a cushion-support for said hub and to permit said rim to swerve laterally in either direction independent of said hub, substantially as and for the purpose specified.

4. In a vehicle-wheel, an outer rim, flexible straps connected thereto, inner radial spokes suspended from said straps, cushions on said inner spokes, and an inner hub supported on said cushions, substantially as specified.

5. In a vehicle-wheel, an outer rim, an inner hollow hub having radial spokes projecting therefrom, each of said spokes having an interposed cushion between its inner end and the interior of said hub, and two or more flexible connecting parts between the outer end of each of said spokes and the wheel-rim, said flexible connecting parts diverging from said spoke to their points of connection to said rim, substantially as specified.

6. In a vehicle-wheel, an outer rim, an inner hub, radial spokes in said hub, flexible connections from said spokes to said rim, cushions on said spokes, and a universal bearing between each of said cushions and said hub to permit lateral movement of said rim independent of said hub, substantially as specified.

7. In a vehicle-wheel, an outer rim, an inner hub, spokes radiating from said hub, flexible connections from the outer ends of said spokes to said rim, a cushion on each of said spokes within said hub, and a collar on each spoke between its springs and the hub having a rounded bearing-face, the said hub at the point of contact with said collars being correspondingly formed, substantially as specified.

8. In a vehicle-wheel, an outer rim, an inner hub, spokes radiating from said hub, the outer ends of said spokes being connected to said rim by flexible connections, an adjusting-nut on the inner end of each spoke, a collar provided with a rounded bearing-face also on each spoke within said hub and providing a universal bearing for said hub which is formed at the point of contact of a shape to correspond to the rounded face of said collar, and a cushion between said nut and collar, substantially as specified.

9. In a vehicle-wheel, an outer rim, an inner hub, radial spokes projecting from said hub, interposed cushions between said spokes and hub, a T-shaped head on the outer end of each of said spokes, flexible connecting parts connected to said head on opposite sides of the radial center of said spoke, said flexible connecting parts being diverged and connected to said rim, substantially as specified.

In testimony whereof I have hereunto set my hand this 28th day of February, A. D. 1906.

ARTHUR A. AMBLER.

Witnesses:
 CHAS. I. WELCH,
 CLARA GALLAGHER.